US007902938B2

(12) United States Patent
Narita

(10) Patent No.: US 7,902,938 B2
(45) Date of Patent: Mar. 8, 2011

(54) DATA TRANSMITTER, DATA TRANSMISSION LINE, AND DATA TRANSMISSION METHOD

(75) Inventor: Kaoru Narita, Tokyo (JP)

(73) Assignee: NEC Corporation (JP)

( * ) Notice: Subject to any disclaimer, the term of this patent is extended or adjusted under 35 U.S.C. 154(b) by 1076 days.

(21) Appl. No.: 10/598,932

(22) PCT Filed: Mar. 29, 2005

(86) PCT No.: PCT/JP2005/005868
§ 371 (c)(1),
(2), (4) Date: Sep. 14, 2006

(87) PCT Pub. No.: WO2005/093895
PCT Pub. Date: Oct. 6, 2005

(65) Prior Publication Data

US 2007/0146091 A1 Jun. 28, 2007

(30) Foreign Application Priority Data

Mar. 29, 2004 (JP) ................................ 2004-094330

(51) Int. Cl.
*H04B 3/28* (2006.01)

(52) U.S. Cl. .......................................... 333/12; 333/236

(58) Field of Classification Search .................... 333/12, 333/236, 20, 164, 243, 245–247
See application file for complete search history.

(56) References Cited

U.S. PATENT DOCUMENTS 4,858,066 A * 8/1989 McSweeney .............. 361/321.5
5,023,574 A 6/1991 Anklam et al.
5,157,361 A * 10/1992 Gruchalla et al. .............. 333/20
5,319,755 A 6/1994 Farmwald et al.
6,154,104 A 11/2000 Hall
6,593,833 B2 7/2003 Joines et al. .................. 333/238

FOREIGN PATENT DOCUMENTS

JP 05-063315 A 3/1993
JP 05-283824 A 10/1993
JP 06-244601 A 9/1994
JP 07-111407 A 4/1995
JP 07-142972 A 6/1995
JP 2000-180520 A 6/2000
JP 2001-111408 A 4/2001
JP 2001-251030 A 9/2001
JP 2003-198215 A 7/2003

* cited by examiner

*Primary Examiner* — Robert Pascal
*Assistant Examiner* — Kimberly E Glenn
(74) *Attorney, Agent, or Firm* — Hayes Soloway P.C.

(57) ABSTRACT

A data transmitter uses a transmission line including a ground conductor (305), a signal conductor (201), and an insulating material (3) which insulates them from each other. The insulating material includes a dielectric (320) exhibiting a nonlinear relationship between a generated electric field and dielectric polarization. The effective reactance per unit length of the transmission line changes depending on the signal voltage. Data is transmitted between integrated circuits (102) via the transmission line, achieving data transmission at a higher speed than a conventional one.

16 Claims, 8 Drawing Sheets

DATA TRANSMITTER, DATA TRANSMISSION LINE, AND DATA TRANSMISSION METHOD

TECHNICAL FIELD

The present invention relates to a data transmitter, data transmission line, and data transmission method and, more particularly, to a data transmitter, data transmission line, and data transmission method between integrated circuits.

BACKGROUND ART

U.S. Pat. No. 5,319,755 (reference 1) discloses a conventional data transmission method between integrated circuits. According to this method, as shown in FIG. 1, a transmission line 1 serving as a data bus connects input/output circuits 3 present in respective integrated circuit chips 2. The transmission line 1 transmits digital signals to transmit data between the integrated circuits 2.

This method poses an upper limit on the data transmission speed between the integrated circuits 2, and it is difficult to transmit a basic clock of several GHz or more. The problem is negligible when the basic clock frequency of a signal propagating through the transmission line 1 is equal to or smaller than several GHz. However, when the basic clock frequency becomes equal to or higher than several GHz, the signal exhibits the dispersion phenomenon owing to the property of the transmission line 1, and the influence of the dispersion phenomenon is not negligible. The dispersion phenomenon is that the pulse transmission speed changes depending on the frequency component, so input and output pulses differ in shape or the pulse width increases, inhibiting high-speed pulse transmission. This problem becomes serious when a capacity 5 accessory to the input/output circuit 3 of the integrated circuit 2 has a larger value.

U.S. Pat. No. 5,023,574 (reference 2) discloses a technique of generating a high-speed pulse. According to this technique, many varactor diodes are arranged at proper intervals in a transmission line to generate a nonlinear wave. This technique is disadvantageously applicable to only a case where the structure of a transmission line is very special, i.e., the transmission line is formed on a board surface, like a microstrip line or coplanar line, because varactor diodes must be inserted midway along the transmission line.

Japanese Patent Laid-Open No. 2001-111408 (reference 3) discloses a structure for packaging a high-speed signal transmission wire. In this structure, the distance between an impedance mismatched portion on a transmitting board and that on a receiving board is set such that the signal transmission time becomes an integer multiple of the time half the signal switching cycle. This structure suppresses temporal fluctuations caused by a reflected wave, and reduces jitters. Japanese Patent Laid-Open No. 2001-251030 (reference 4) discloses a line system between integrated circuits that controls a signal transmission delay by arranging a capacitive load structure on a line connecting integrated circuits.

Japanese Patent Laid-Open No. 2003-198215 (reference 5) discloses an arrangement which unifies the signal transmission speed. According to this reference, a long transmission line is formed in a low-permittivity region, and a short transmission line is formed in a high-permittivity region on a transmission line board on which a plurality of circuit components are mounted on a dielectric board and many transmission lines for connecting the circuit components are formed on the dielectric substrate. Japanese Patent Laid-Open No. 5-63315 (reference 6) discloses a printed wiring board on which delay pads are arranged on part of a signal line on the printed wiring board, and delay pads corresponding in number to a change of the delay time so that the control signal and data signal become in phase.

Japanese Patent Laid-Open No. 5-283824 (reference 7) discloses a circuit board configured to prevent reflection between devices having different electrode pads by coating a circuit board having a specific permittivity with a material having a different permittivity and controlling the permittivity.

DISCLOSURE OF INVENTION

Problems to be Solved by the Invention

It is, therefore, an object of the present invention to implement a high data transmission speed of several Gbits/sec to 10 Gbits/sec or more in data transmission between integrated circuits.

It is another object of the present invention to achieve a high data transmission speed even by using transmission lines formed not only on a general printed wiring board but also in layers of a high-density multilayered printed wiring board.

Means of Solution to the Problems

In order to achieve the above objects, a data transmitter according to the present invention is characterized by comprising a plurality of integrated circuits each having at least one input/output circuit, and a transmission line which connects to the input/output circuits of the integrated circuits and has an element that changes an effective reactance per unit length depending on at least one of a signal voltage and a signal current.

A data transmission line according to the present invention is characterized by comprising an element which changes an effective reactance per unit length depending on at least one of a signal voltage and a signal current.

A data transmission method according to the present invention is characterized by comprising the steps of preparing a transmission line whose effective reactance per unit length changes depending on at least one of a signal voltage and a signal current, and transmitting a signal between a plurality of integrated circuits via the transmission line.

Effects of the Invention

The present invention can change the effective reactance per unit length of a transmission line (data transmission line) in accordance with at least one of the signal voltage and signal current of a transmitted pulse signal. As a result, a nonlinear wave is generated in the transmission line, and a transmitted pulse signal can reach the receiving side without any influence of the dispersion phenomenon caused by the transmission line. Since the pulse waveform hardly changes and the pulse width hardly increases, high-speed data transmission can be achieved.

No varactor diode need be inserted in the transmission line, unlike the prior art. High-speed data transmission can be implemented even using transmission lines formed not only on a general printed wiring board but also in layers of a high-density multilayered printed wiring board.

BEST MODE FOR CARRYING OUT THE INVENTION

Embodiments of the present invention will be described in detail with reference to the accompanying drawings.

Outline of Embodiments

Figure 2:
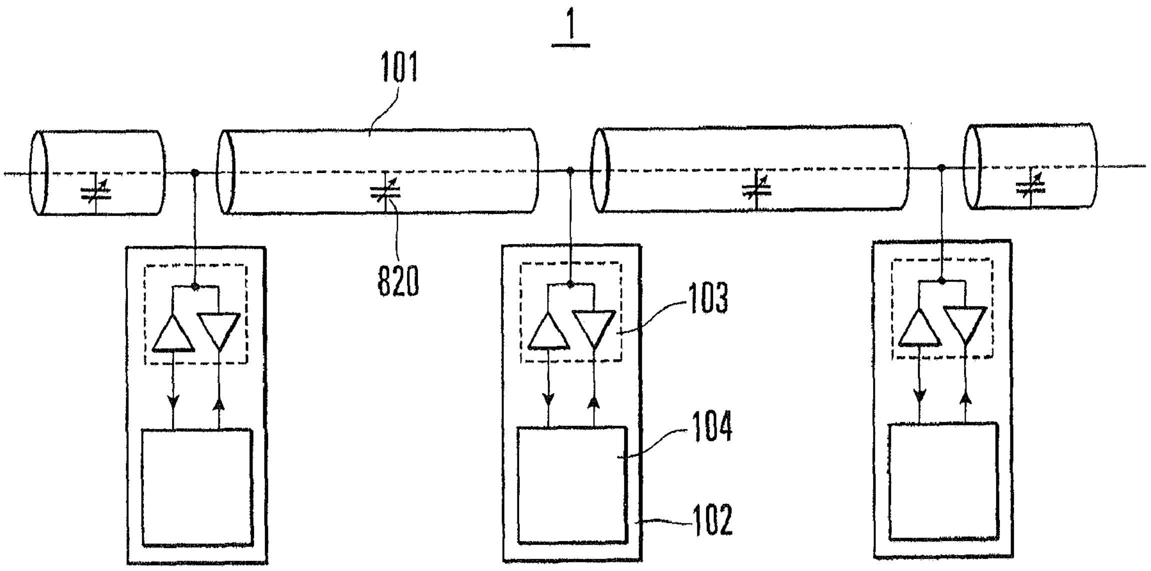
FIG. 2 is a block diagram showing the arrangement of a data transmitter between integrated circuits according to the first embodiment of the present invention.
Figure 10:
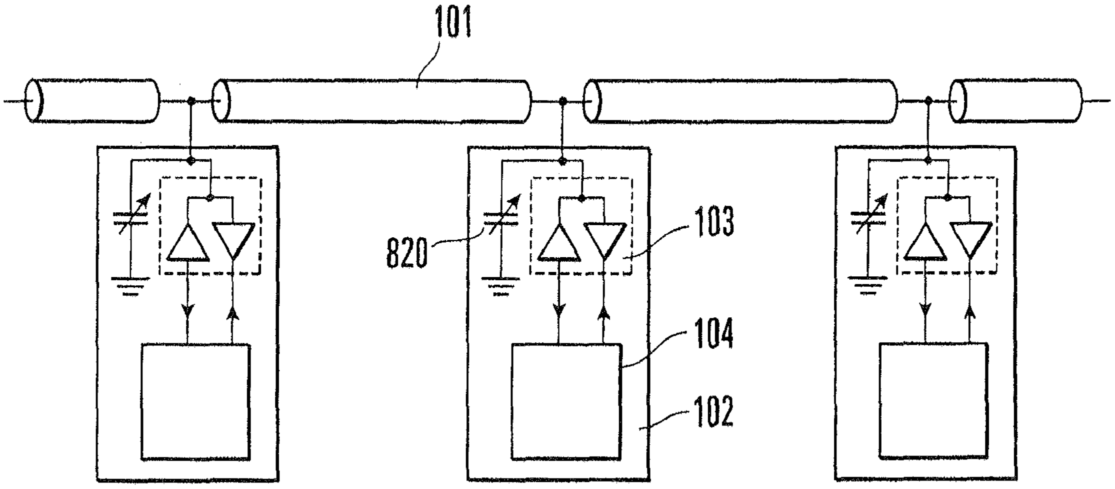
FIG. 10 is a block diagram showing the arrangement of a data transmitter between integrated circuits according to the second embodiment of the present invention.

As shown in FIGS. 2 and 10, a data transmitter between integrated circuits according to embodiments of the present invention comprises a plurality of integrated circuits 102 and a transmission line (data transmission line between integrated circuits) 101 which connects the integrated circuits 102.

One integrated circuit 102 comprises an internal circuit 104 having a proper arrangement and at least one appropriate input/output circuit 103. The input/output circuit 103 connects to the transmission line 101. These circuit arrangements are not particularly limited, and an integrated circuit 102 of a known arrangement is available.

The effective reactance component per unit length of the transmission line 101 changes depending on at least one of the signal voltage and signal current. More specifically, the transmission line 101 comprises an element which changes at least one of the effective capacitive component and effective inductance component per unit length depending on at least one of the signal voltage and signal current.

Figure 3:
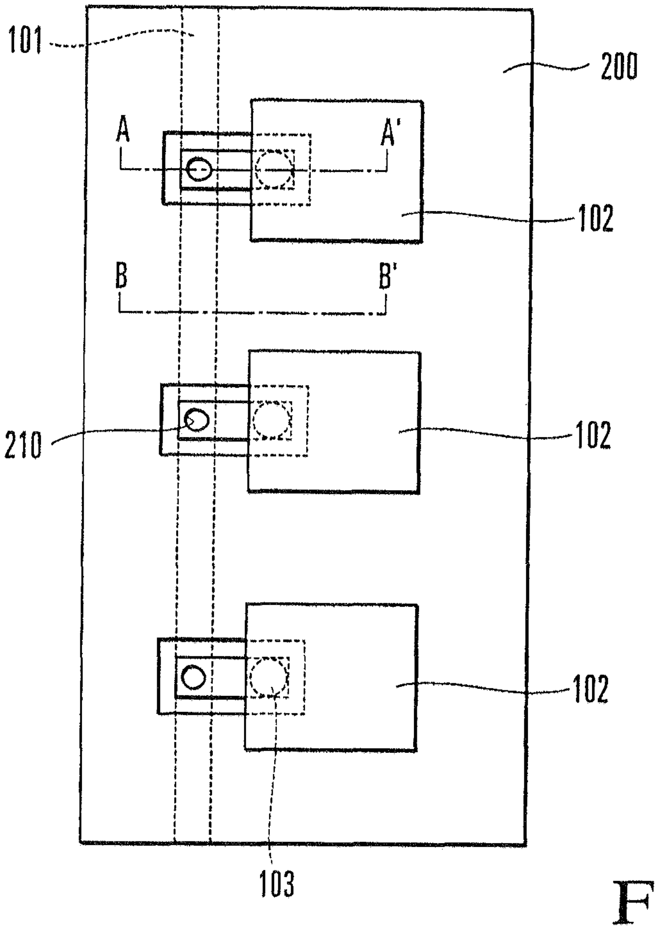
FIG. 3 is a plan view showing an example of a concrete structure for implementing the data transmitter between integrated circuits shown in FIG. 2.
Figure 4:
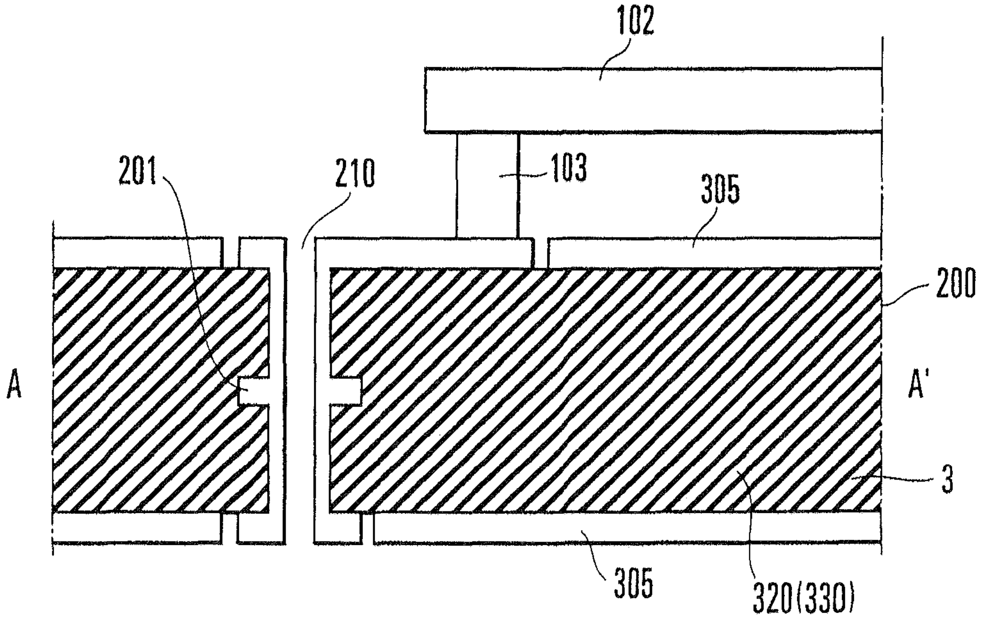
FIG. 4 is a sectional view taken along the line A-A' in FIG. 3.
Figure 5:
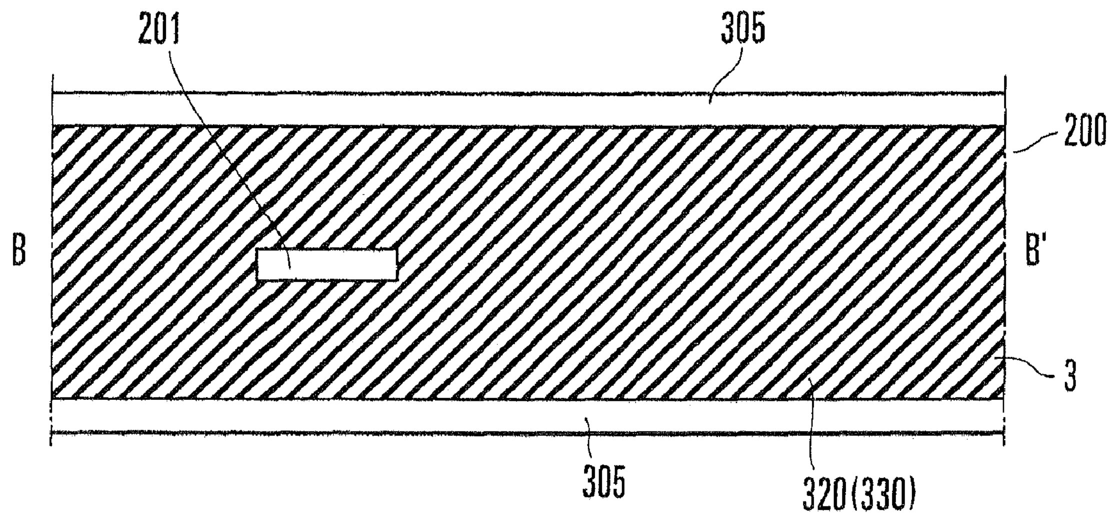
FIG. 5 is a sectional view taken along the line B-B' in FIG. 3.

As shown in FIGS. 3 to 5, the transmission line 101 may be formed in a proper printed wiring board 200. In this case, the transmission line 101 comprises a ground conductor 305 formed on the printed wiring board 200, an insulating material 3 arranged in the printed wiring board 200, and a signal conductor 201 arranged in the insulating material 3. Note that the ground conductor 305 may be formed in the printed wiring board 200.

Figure 11:
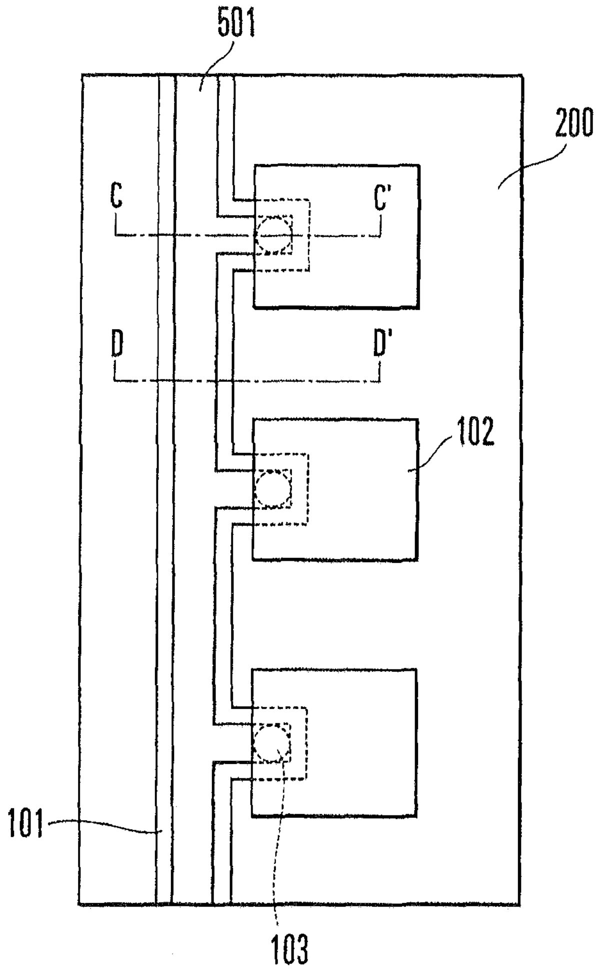
FIG. 11 is a plan view showing an example of a concrete structure for implementing the data transmitter between integrated circuits shown in FIG. 10.
Figure 12:
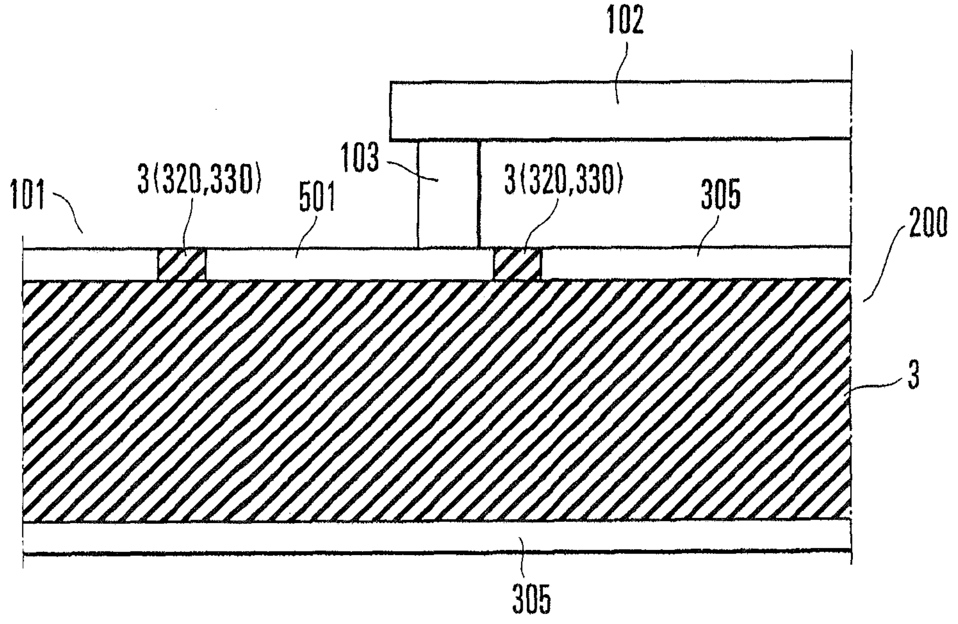
FIG. 12 is a sectional view taken along the line C-C' in FIG. 11.
Figure 13:
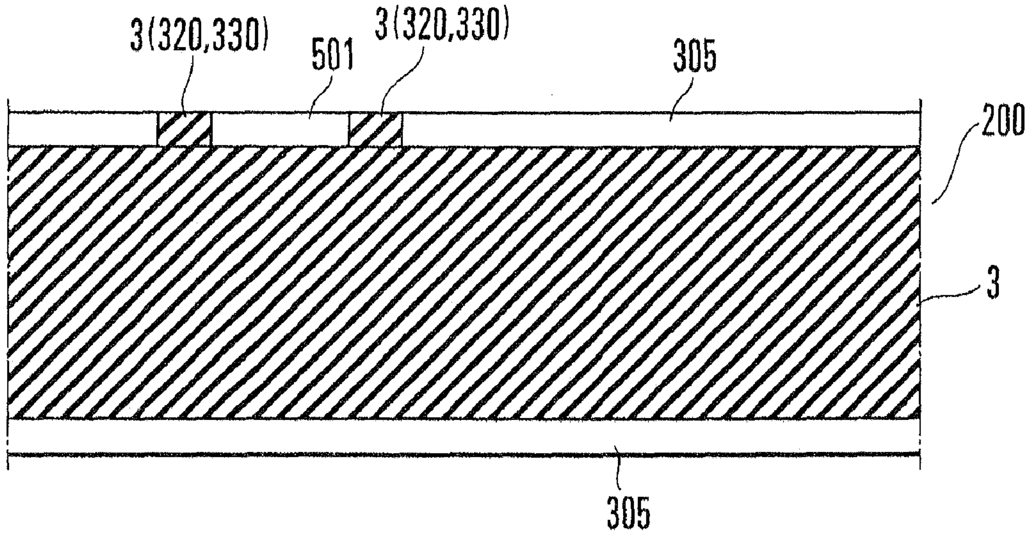
FIG. 13 is a sectional view taken along the line D-D' in FIG. 11.

Alternatively, as shown in FIGS. 11 to 13, the transmission line 101 may be formed on the proper printed wiring board 200. In this case, the transmission line 101 comprises a ground conductor 305 and signal conductor 501 formed apart from each other on the printed wiring board 200, and an insulating material 3 which is sandwiched between the ground conductor 305 and the signal conductor 501 on the printed wiring board 200 and is joined to the ground conductor 305 and signal conductor 501.

The ground conductor 305 is grounded, a signal voltage is applied between the signal conductor 201 and the ground conductor 305, and the insulating material 3 insulates the signal conductor 201 and ground conductor 305 from each other.

Figure 6:
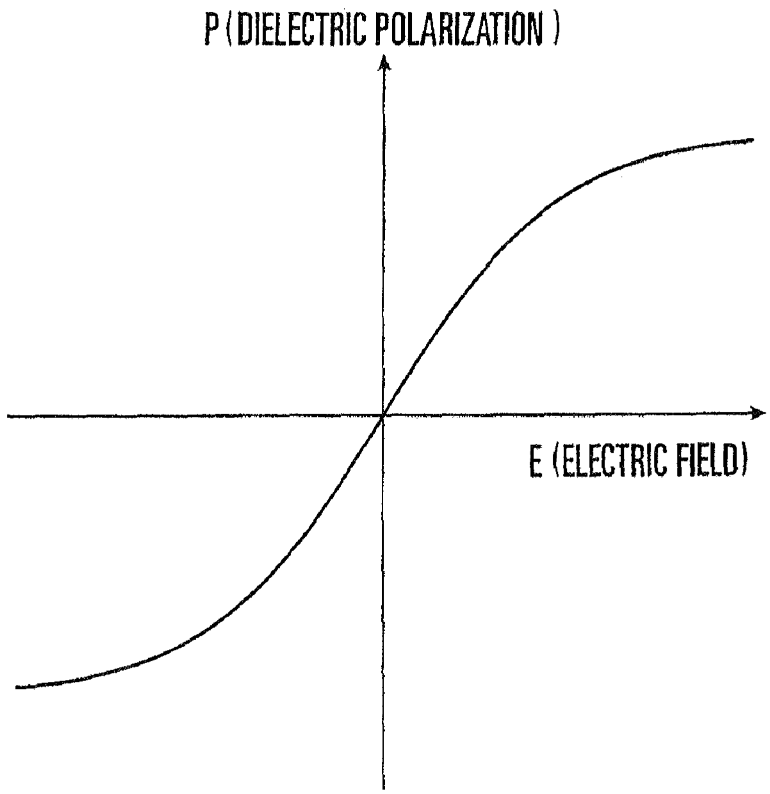
FIG. 6 is a graph showing the relationship between the electric field and dielectric polarization of a dielectric used for a transmission line.

The insulating material 3 contains, e.g., a dielectric 320 as an element which changes the effective reactance per unit length of the transmission line 101 depending on at least one of the signal voltage and signal current. As shown in FIG. 6, the dielectric 320 is a material exhibiting a nonlinear relationship between an electric field and dielectric polarization generated in the dielectric 320. For example, at least one of lead zirconate titanate, bismuth strontium tantalate, ferroelectric, and liquid crystal is available as the dielectric 320.

Figure 8:
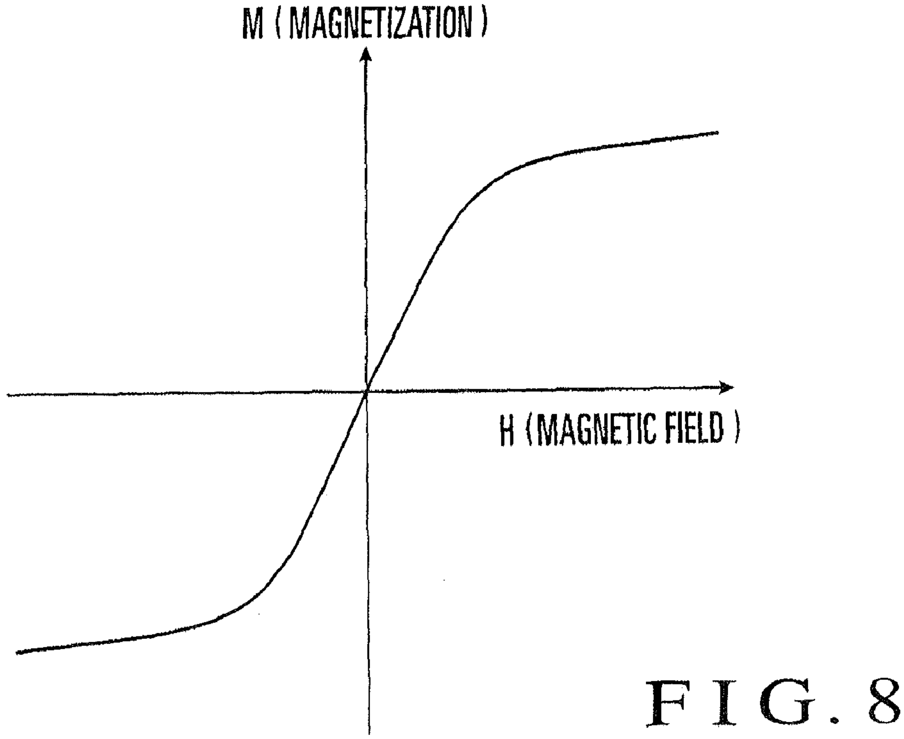
FIG. 8 is a graph showing the relationship between the magnetic field and magnetization of a magnetic substance used for the transmission line.

Instead of the dielectric 320, a magnetic substance 330 is also available as the above-mentioned element. As shown in FIG. 8, the magnetic substance 330 is a material representing a nonlinear relationship between a magnetic field and magnetization generated in the magnetic substance 330. For example, at least one of NiZn ferrite and sendust (Fe—Si—Al alloy) is available as the magnetic substance 330.

Note that the maximum value of a change component in the effective reactance per unit length that changes depending on at least one of the signal voltage and signal current in the transmission line 101 is preferably equal to or larger than a fixed component independent of the signal voltage and signal current.

The above-mentioned integrated circuit 102 and transmission line 101 may be formed on the same printed wiring board 200, as shown in FIGS. 3 to 5, or formed on different substrates. It is also possible to adopt an arrangement in which the transmission line 101 is formed singly and connected to the input/output circuit 103 of each integrated circuit 102.

Embodiments of the present invention will be described in more detail.

First Embodiment

A data transmitter 1 between integrated circuits and a transmission line 101 according to the first embodiment of the present invention will be explained with reference to FIGS. 2 to 5.

As shown in FIG. 2, a plurality of integrated circuits 102 have input/output circuits 103, which connect to the transmission line 101. The integrated circuits 102 exchange data by transmitting/receiving digital pulses from/by the input/output circuits 103.

In FIGS. 3 to 5, each integrated circuit 102 is formed from an integrated circuit chip 102, and a plurality of integrated circuit chips 102 are arranged on a printed wiring board 200. The integrated circuit 102 has an input/output terminal 103 as the input/output circuit 103.

The printed wiring board 200 has the transmission line 101. The transmission line 101 is a strip line formed from an insulating material 3, a ground conductor 305 formed on the insulating material 3, and a signal conductor 201 arranged in the insulating material 3. The insulating material 3 has a through via hole 210. The input/output terminal 103 of the integrated circuit chip 102 connects to the signal conductor 201 via the through via hole 210.

The insulating material 3 uses a dielectric 320. The dielectric 320 is a material such as ferroelectric or liquid crystal which exhibits a nonlinear relationship between the electric field E and dielectric polarization P in the dielectric, as shown in FIG. 6. In the example of FIG. 6, the dielectric 320 has a characteristic of gradually increasing the absolute value of the dielectric polarization P as the absolute value of the electric field E increases.

Figure 7:
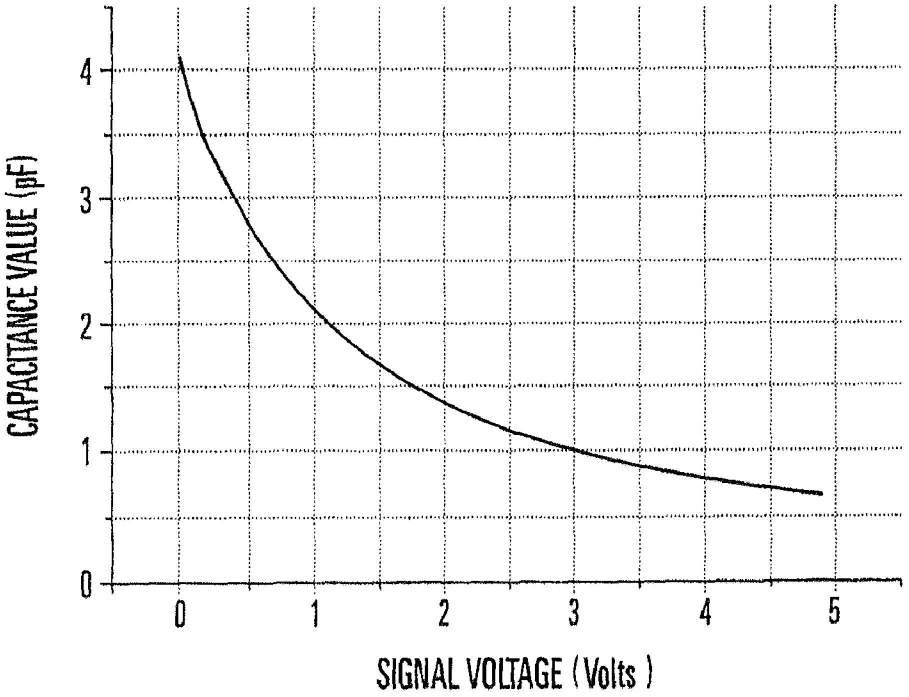
FIG. 7 is a graph showing the relationship between the capacitance of the transmission line and the signal voltage in the use of a dielectric having the characteristic shown in FIG. 6 for the transmission line.

From this, as shown in FIG. 7, the capacitive component C (pF) per unit length of the strip line changes depending on the signal voltage V. In the example of FIG. 7, the capacitive component C decreases as the signal voltage V rises.

When the relation of equation (1) holds, a nonlinear wave having a pulse width T given by equation (2) is generated in response to input of an electrical pulse signal to the transmission line 101:

$$C(V)=1/(aV+b) \quad (1)$$

$$T=[LC(V_0)\{(aV_0+b)/a\}/A]^{1/2} \quad (2)$$

where A is the pulse amplitude and $V_0$ is the offset value of the signal voltage.

The waveform (signal voltage) of the nonlinear wave is given by $$V(x,t)=A\,\mathrm{sec}h^2(kx-\omega t) \quad (3)$$

In this case, k satisfies equation (4) and ω satisfies equation (5):

$$\sin hk=[A/F(V_0)]^{1/2} \quad (4)$$

$$\omega=[A/\{LC(V_0)F(V_0)\}]^{1/2} \quad (5)$$

where $$F(V_0)\equiv 1/\{aC(V_0)\}=a/b+V_0 \quad (6)$$

where $V_0$ is the offset value of the signal voltage.

In the first embodiment, as shown in FIG. 2, a nonlinear capacitor 820 is formed between the signal conductor 201 and ground conductor 305 of the transmission line 101.

The data transmitter 1 between integrated circuits according to the first embodiment may adopt a dielectric which changes the effective inductance component per unit length (cm) of the transmission line 101 depending on at least one of the signal voltage and signal current.

Since a nonlinear wave generated in the transmission line 101 is a solitary wave free from any dispersion, the pulse width does not increase on the receiving side or the waveform does not change. Data transmission between the integrated circuits 102 can use short-width pulses, implementing high-speed data transmission at several Gbits/sec to 10 Gbits/sec or more.

An example of using the dielectric 320 as the insulating material 3 has been described, but a magnetic substance 330 is also available as the insulating material 3. The magnetic substance 330 is a material representing a nonlinear relationship between the magnetic field H and magnetization M generated in the magnetic substance 330, as shown in FIG. 8. In the example of FIG. 8, the magnetic substance 330 has a characteristic of gradually increasing the absolute value of the magnetization M as the absolute value of the magnetic field H increases.

By using the magnetic substance 330 as part of the insulating material 3, a nonlinear wave can be generated in response to input of an electrical pulse signal to the transmission line 101, similar to the use of the above-mentioned dielectric 320.

Figure 9:
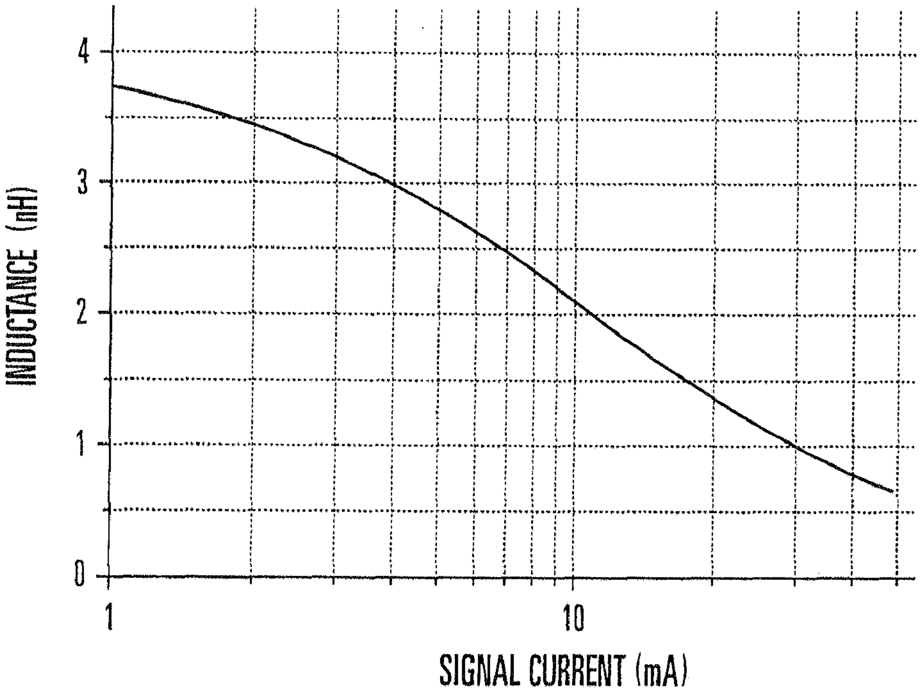
FIG. 9 is a graph showing the relationship between the inductance of the transmission line and the signal current in the use of a magnetic substance having the characteristic shown in FIG. 8 for the transmission line.

For example, the effective inductance component per unit length (cm) of the transmission line 101 is set to change with, e.g., a state as shown in FIG. 9 depending on the signal current (the effective inductance component decreases along with an increase in signal current). This arrangement can generate a nonlinear wave in response to input of an electrical pulse signal to the transmission line 101. Data transmission between the integrated circuits 102 can use short-width pulses, achieving high-speed data transmission at several Gbits/sec to 10 Gbits/sec or more.

Second Embodiment

A data transmitter 1 between integrated circuits and a transmission line 101 according to the second embodiment of the present invention will be described with reference to FIGS. 10 to 13.

The second embodiment is different from the first embodiment in that a signal conductor 501 of the transmission line 101 is formed on the surface of a printed wiring board 200. The transmission line 101 connects to input/output circuits 103 of a plurality of integrated circuits 102 arranged on the printed wiring board 200 to execute data transmission between the integrated circuits 102.

In FIGS. 11 to 13, each integrated circuit 102 is formed from an integrated circuit chip 102, and a plurality of integrated circuit chips 102 are arranged on the printed wiring board 200. The integrated circuit 102 has an input/output terminal 103 as the input/output circuit 103.

The printed wiring board 200 has the transmission line 101. The transmission line 101 is a coplanar line formed from the signal line conductor 501, ground conductors 305 arranged on the two sides of the signal line conductor 501 so as to be spaced apart from the signal line conductor 501, and an insulating material 3 interposed between the signal line conductor 501 and the ground conductor 305.

A dielectric 320 contained as at least part of the insulating material 3 is a material such as ferroelectric or liquid crystal which exhibits a nonlinear relationship between the electric field E and dielectric polarization P in the dielectric. The capacitive component C per unit length of the coplanar line changes depending on the signal voltage V. Since a nonlinear wave is generated in correspondence with an electrical pulse signal to be transmitted in the transmission line 101 in data transmission between a plurality of integrated circuits 102, high-speed data transmission at several Gbits/sec to 10 Gbits/sec or more can be implemented.

Also in the second embodiment, a magnetic substance 330 can replace the dielectric 320 contained in the insulating material 3.

The whole printed wiring board 200 shown in FIGS. 12 and 13 may be made of the insulating material 3, e.g., silicon, glass, or ceramics.

Alternatively, the printed wiring board 200 may be made of the insulating material 3 at least partially containing the dielectric 320 or magnetic substance 330. In this case, the insulating material 3 interposed between the signal line conductor 501 and the ground conductor 305 on the surface of the printed wiring board 200 may contain neither the dielectric 320 nor magnetic substance 330.

In the second embodiment, as shown in FIG. 10, the contact between the input/output circuit 103 of the integrated circuit 102 and a nonlinear capacitor 820 connects to the transmission line 101. The nonlinear capacitor 820 has a characteristic of decreasing the capacitance as the signal voltage rises. The effective capacitance per unit length of the transmission line 101 changes depending on the signal voltage. The present invention can, therefore, be practiced by adjusting the circuit arrangement so as to generate a nonlinear wave in the transmission line 101.

A circuit simulation (SPICE) was done to confirm one of conditions under which a nonlinear wave is generated in the insulating material 3 containing the dielectric 320 or magnetic substance 330 in the transmission line 101 according to the second embodiment.

A circuit used for this simulation is identical to that shown in FIG. 10, and a plurality of nonlinear capacitors 820 and a plurality of integrated circuits 102 connect to a transmission line 101 having an overall length of 90 cm at an interval of 1 cm. As parameters of the transmission line 101, the capacitance C per unit length (1 cm)=1.1 pF, the inductance L=2.9 nH, and the resistance R=4.8 mΩ. The nonlinear capacitor 820 was a varicap diode (variable-capacitance diode). The nonlinear capacitor 820 had a characteristic shown in FIG. 7, and decreased the capacitance value when the signal voltage rose.

Figure 1:
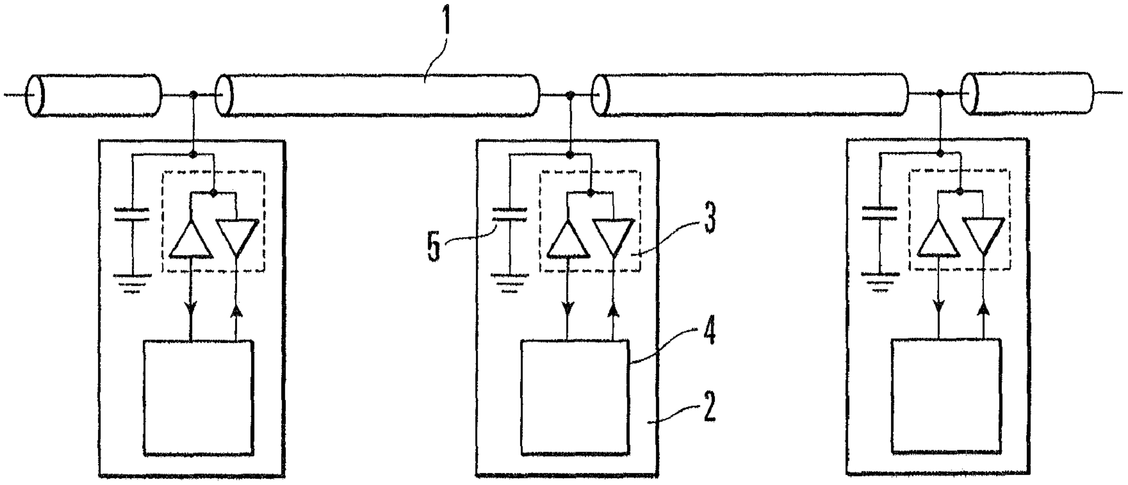
FIG. 1 PRIOR ART
FIG. 1 is a block diagram showing a conventional data transmitter between a plurality of integrated circuits that transmits data between the integrated circuits via a transmission line.

As a comparison with the simulation, an arrangement was used and examined in which a conventional data transmitter between integrated circuits shown in FIG. 1 was adopted and a fixed capacitor 840 in each integrated circuit 102 had a capacitance of a predetermined value (2 pF) regardless of the signal value.

Figure 14:
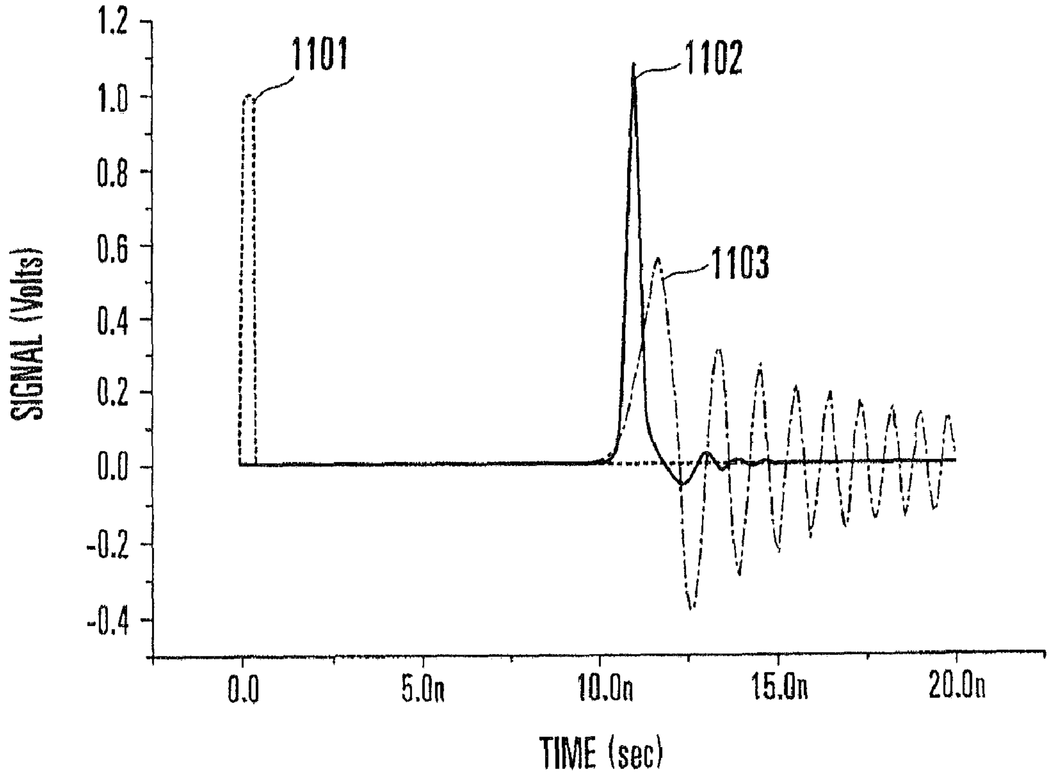
FIG. 14 is a graph showing the circuit simulation results of data transmitters each between integrated circuits according to the embodiment and prior art.

FIG. 14 shows a waveform which appears on the other end (receiving side) of the transmission line 101 when supplying a 0.3-ns wide rectangular pulse 1101 as an input pulse to one end (transmitting side) of the transmission line 101. When the capacitance value is constant, like the prior art, a waveform 1103 appearing on the receiving side increases its pulse width and decreases its amplitude owing to the dispersion phenomenon. To the contrary, in the use of the nonlinear capacitor 820, like the second embodiment, a waveform 1102 appearing on the receiving side hardly increases its pulse width and rarely decreases its amplitude.

In the present invention, it is one of preferable conditions that, for example, the capacitance value of the nonlinear capacitor 820 shown in FIG. 10 changes depending on the signal voltage.

It is another preferable condition that the maximum value of the nonlinear capacitor 820 is equal to or larger than the capacitance value (fixed value independent of the signal voltage) per unit length of the transmission line 101 in FIG. 10. By satisfying this condition, the influence of the nonlinear capacitor 820 becomes prominent to facilitate generation of a nonlinear wave in the transmission line 101.

The transmission lines 101 are desirably formed on the surface of the printed wiring board 200, but may be formed in the printed wiring board 200. When the transmission lines 101 are formed on the surface of the printed wiring board 200, i.e., the surface of the circuit board, they can be formed by only a limit number depending on the area of the circuit board. In contrast, when the transmission lines 101 are formed in the circuit board, they can be formed and stacked in the circuit board or multilayered board. By increasing the number of layers, the number of transmission lines 101 can be increased. When the number of transmission lines 101 is determined, the circuit board is multilayered to reduce the area, achieving significant downsizing and implementing a high-density packaged circuit.

Third Embodiment

Figure 15:
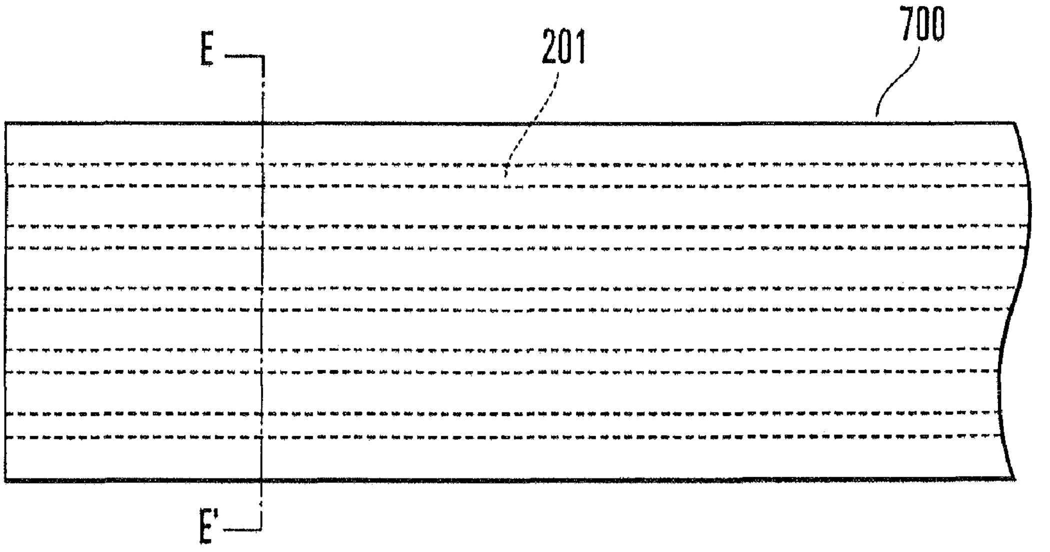
FIG. 15 is a plan view showing the arrangement of a transmission line according to the third embodiment of the present invention.
Figure 16:
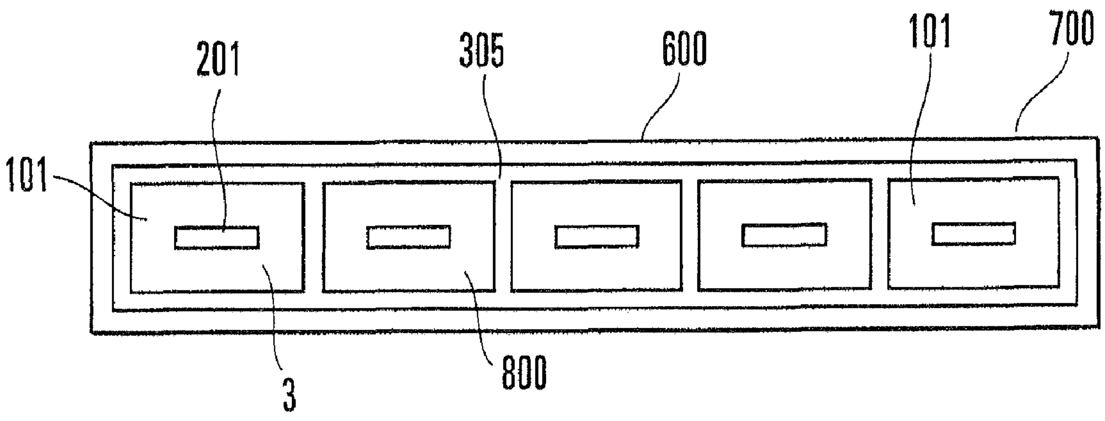
FIG. 16 is a sectional view taken along the line E-E' in FIG. 15.

A transmission line 101 according to the third embodiment of the present invention will be explained with reference to FIGS. 15 and 16.

Unlike the first and second embodiments, the transmission line 101 according to the third embodiment is formed separately from a printed wiring board 200. A plurality of transmission lines 101 are parallel-arrayed to form a flexible multicore cable 700 covered with a proper outer insulator 600.

In the flexible multicore cable 700, a ground conductor 305 forms a plurality of parallel-arrayed closed conduits 800. The closed conduit 800 is a cylindrical conduit having upper, lower, right, and left wall surfaces. Each closed conduit 800 is filled with an insulating material 3 at least partially containing a dielectric 320 or magnetic substance 330. The insulating material 3 contains a signal conductor 201.

Even with this arrangement, the capacitive component C per unit length changes depending on the signal voltage V. Similar to the first embodiment, a nonlinear wave can be generated in the transmission line 101 to achieve high-speed data transmission at several Gbits/sec to 10 Gbits/sec or more.

In the above embodiments, the transmission line 101 is formed on the printed wiring board 200, and the effective reactance per unit length changes depending on at least one of the signal voltage and signal current. In data transmission between a plurality of integrated circuits 102, a nonlinear wave is generated in the transmission line 101 in correspondence with an electrical pulse signal to be transmitted. As a result, the electrical pulse signal reaches the receiving side without any influence of the dispersion phenomenon caused by the transmission line 101. The pulse waveform of the electrical pulse signal hardly changes, its pulse width hardly increases, and high-speed data transmission can be executed.

The above-described embodiments can implement high-speed data transmission by the printed wiring board 200, and can greatly reduce the cost in comparison with the use of expensive optical communication or a coaxial cable. Many channels can fall within one printed wiring board 200, which contributes to high-density data transmission. That is, low-cost, high-speed, high-density data transmission can be achieved between integrated circuits.

The invention claimed is:

1. A data transmitter characterized by comprising:

a plurality of integrated circuits each having at least one input/output circuit; and a transmission line which connects to the input/output circuits of said integrated circuits and has an element that changes an effective reactance per unit length depending on at least one of a signal voltage and a signal current, wherein said transmission line is formed at least in or on a printed wiring board, and wherein a maximum value of a change component in the effective reactance per unit length that changes depending on at least one of the signal voltage and the signal current in said transmission line is not smaller than a value of a fixed component independent of the signal voltage and the signal current.

2. A data transmitter according to claim 1, characterized in that said integrated circuits and said transmission line are formed on the printed wiring board, and the printed wiring board is a single printed wiring board.

3. A data transmitter according to claim 1, characterized in that said transmission line comprises a grounded ground conductor, a signal conductor which receives said signal voltage between the ground conductor and the signal conductor, and an insulating material which contains the element and insulates the signal conductor and the ground conductor from each other.

4. A data transmitter according to claim 3, characterized in that the element includes one of a dielectric and a magnetic substance.

5. A data transmitter according to claim 4, characterized in that the dielectric exhibits a nonlinear relationship between an electric field and dielectric polarization generated in the dielectric.

6. A data transmitter according to claim 5, characterized in that the dielectric is at least one of lead zirconate titanate, bismuth strontium tantalate, ferroelectric, and liquid crystal.

7. A data transmitter according to claim 4, characterized in that the magnetic substance exhibits a nonlinear relationship between a magnetic field and magnetization generated in the magnetic substance.

8. A data transmitter according to claim 7, characterized in that the magnetic substance is at least one of NiZn ferrite and sendust.

9. A data transmission line characterized by comprising:

said data transmission line connecting input/output circuits of a plurality of integrated circuits;

an element which changes an effective reactance per unit length depending on at least one of a signal voltage and a signal current;

a grounded ground conductor;

a signal conductor which receives said signal voltage between said ground conductor and said signal conductor; and an insulating material which contains the element and insulates said signal conductor and said ground conductor from each other, wherein said ground conductor is formed at least in or on a printed wiring board, said insulating material is arranged in the printed wiring board, and said signal conductor is arranged in said insulating material, and wherein a maximum value of a change component in the effective reactance per unit length that changes depending on at least one of the signal voltage and the signal current is not smaller than a value of a fixed component independent of the signal voltage and the signal current.

10. A data transmission line according to claim 9, characterized in that the element includes one of a dielectric and a magnetic substance.

11. A data transmission line according to claim 10, characterized in that the dielectric exhibits a nonlinear relationship between an electric field and dielectric polarization generated in the dielectric.

12. A data transmission line according to claim 11, characterized in that the dielectric is at least one of lead zirconate titanate, bismuth strontium tantalate, ferroelectric, and liquid crystal.

13. A data transmission line according to claim 10, characterized in that the magnetic substance exhibits a nonlinear relationship between a magnetic field and magnetization generated in the magnetic substance.

14. A data transmission line according to claim 13, characterized in that the magnetic substance is at least one of NiZn ferrite and sendust.

15. A data transmission line according to claim 9, characterized in that a plurality of data transmission lines are parallel-arrayed.

16. A data transmission line characterized by comprising:

said data transmission line connecting input/output circuits of a plurality of integrated circuits;

an element which changes an effective reactance per unit length depending on at least one of a signal voltage and a signal current;

a grounded ground conductor;

a signal conductor which receives said signal voltage between said ground conductor and said signal conductor; and an insulating material which contains the element and insulates said signal conductor and said ground conductor from each other, wherein said ground conductor and said signal conductor are formed apart from each other on a printed wiring board, and said insulating material is arranged between said ground conductor and said signal conductor on the printed wiring board and joined to said ground conductor and said signal conductor, and wherein a maximum value of a change component in the effective reactance per unit length that changes depending on at least one of the signal voltage and the signal current is not smaller than a value of a fixed component independent of the signal voltage and the signal current.

* * * * *